United States Patent
Park et al.

(10) Patent No.: US 9,525,730 B2
(45) Date of Patent: Dec. 20, 2016

(54) METHOD AND APPARATUS FOR PROCESSING SERVER LOAD BALANCING BY USING THE RESULT OF HASH FUNCTION

(75) Inventors: Myoung-Sun Park, Seongnam (KR); Tawan Weon, Seongnam (KR)

(73) Assignee: SOLBOX INC, Seoul (KR)

( * ) Notice: Subject to any disclaimer, the term of this patent is extended or adjusted under 35 U.S.C. 154(b) by 172 days.

(21) Appl. No.: 14/358,125

(22) PCT Filed: Jul. 18, 2012

(86) PCT No.: PCT/KR2012/005726
§ 371 (c)(1),
(2), (4) Date: May 14, 2014

(87) PCT Pub. No.: WO2013/094837
PCT Pub. Date: Jun. 27, 2013

(65) Prior Publication Data
US 2014/0337417 A1   Nov. 13, 2014

(30) Foreign Application Priority Data

Dec. 19, 2011 (KR) .......................... 10-2011-0137596
Jun. 18, 2012 (KR) .......................... 10-2012-0065182

(51) Int. Cl.
*H04L 29/08* (2006.01)

(52) U.S. Cl.
CPC ..... *H04L 67/1023* (2013.01); *H04L 29/08234* (2013.01); *H04L 67/1027* (2013.01); *H04L 67/2819* (2013.01)

(58) Field of Classification Search
CPC ................... H04L 29/08144–29/08234; H04L 67/1002–67/1027; H04L 67/2819
See application file for complete search history.

(56) References Cited

U.S. PATENT DOCUMENTS

| | | | |
|---|---|---|---|
| 7,774,470 B1 * | 8/2010 | Sanders | H04L 63/1483 709/219 |
| 2006/0064478 A1 * | 3/2006 | Sirkin | H04L 29/12066 709/223 |
| 2006/0087968 A1 * | 4/2006 | Bowen, Jr. | H04L 29/06 370/229 |
| 2006/0209900 A1 * | 9/2006 | Sekaran | H04L 67/10 370/503 |
| 2009/0028160 A1 * | 1/2009 | Eswaran | H04L 45/745 370/395.32 |
| 2009/0271515 A1 * | 10/2009 | Iyengar | H04L 67/1008 709/226 |

(Continued)

FOREIGN PATENT DOCUMENTS

| | | |
|---|---|---|
| KR | 1019970009032 | 2/1997 |
| KR | 1020030027485 | 4/2003 |
| WO | 2009/046642 A1 | 4/2009 |

*Primary Examiner* — Hee Soo Kim
*Assistant Examiner* — Clayton R Williams
(74) *Attorney, Agent, or Firm* — Dinsmore & Shohl LLP

(57) ABSTRACT

For load balancing of a plurality of servers, a server load balancing apparatus selects a hash source from a uniform resource locator (URL) input from a client, and applies a predetermined hash function to the hash source. The server load balancing apparatus selects a server from among the plurality of servers according to a hash value based on the hash result of the hash function application.

19 Claims, 10 Drawing Sheets

(56) References Cited

U.S. PATENT DOCUMENTS

| | | | |
|---|---|---|---|
| 2010/0153337 A1* | 6/2010 | Murata | G06F 17/30575 |
| | | | 707/610 |
| 2010/0332664 A1* | 12/2010 | Yevmenkin | H04L 29/12405 |
| | | | 709/227 |
| 2011/0035437 A1 | 2/2011 | Toumura | |
| 2012/0002542 A1* | 1/2012 | Xu | H04L 67/1004 |
| | | | 370/230 |
| 2014/0032477 A1* | 1/2014 | Trammel | G06F 9/5061 |
| | | | 707/600 |

\* cited by examiner

FIG. 4

(A) http:// vod.domain.com $\underbrace{\text{v}\emptyset\text{d /sample.mp4}}_{\text{FILE PATH}}$ ?id = 1234

(B) MD5('/vod/sample.mp4') = $\underbrace{\text{195f6cb0d67907f2efb43ce8868cacb0}}_{\substack{\text{MD5 HASH RESULT}\\\text{(32-DIGIT STRING)}}}$ (C) CRC32('/vod/sample.mp4') = $\underbrace{\text{3756904710}}_{\substack{\text{CRC32 HASH RESULT}\\\text{(10-DIGIT INTEGER)}}}$

METHOD AND APPARATUS FOR PROCESSING SERVER LOAD BALANCING BY USING THE RESULT OF HASH FUNCTION

CROSS-REFERENCE TO RELATED APPLICATIONS

This application is the U.S. National Phase of PCT/KR2012/005726 filed Jul. 18, 2012, which claims priority of Korean Patent Application No. 10-2011-0137596 filed Dec. 19, 2011 and Korean Patent Application No. 10-2012-0065182 filed Jun. 18, 2012.

TECHNICAL FIELD

The present invention relates to a method and apparatus for processing server load balancing.

BACKGROUND ART

Server load balancing efficiently divides traffic to a plurality of servers which provide the same service to distribute workload of a server, which increases server availability and network bandwidth efficiency.

FIG. 1 shows a prior server load balancing.

In server load balancing in layer 4 (L4), as shown in (a) of FIG. 1, a load balancing apparatus determines which host a packet is transmitted to, with reference to information on the L4 included in the packet, that is, Internet protocol (IP) and port information.

Also, in server load balancing in layer 7 (L7), as shown in (b) of FIG. 1, a load balancing apparatus determines which host a packet is transmitted to, with reference to information on the L7 included in the packet, that is, payload information (for example, hypertext transfer protocol (HTTP) header information).

As in the L7, contents are divided and stored according to servers and server balancing is performed based on the payload information which is a domain of HTTP, a uniform resource locator (URL) path, a file extension, and others. Further, in the L4, a network address translation (NAT) method for performing load balancing based on the IP of a server and the port information is widely used.

Recently, the size of contents through a network has increased and the volume of contents has also increased, thereby there is a certain limit to manage the contents with a direct attached storage (DAS) structure in which a server stores the entire contents. Accordingly, a method in which an original server stores contents and a service server requests contents from the original server only when it is needed and provides the contents to a client is used. A method such as a network attached storage (NAS), a storage area network (SAN), an HTTP, and a file system is used for connection between an edge server and a storage unit.

However, the larger the number and the volume of contents is, the smaller the number of contents which are hit in a local disk or a memory of the edge server is, the larger the frequency of requesting contents from an original server is, and then the larger the load of the edge server is. Also, the number of cases in which the edge server requests contents from the original server increases, and thereby the load of the original server increases.

DISCLOSURE

Technical Problem

The present invention has been made in an effort to provide a method and apparatus for efficiently distributing a load of servers.

Technical Solution

An exemplary embodiment of the present invention provides a method for processing server load balancing, including: receiving, by a server load balancing apparatus, a uniform resource locator (URL) from a client; selecting, by the server load balancing apparatus, a hash source from the URL and applying a predetermined hash function to the hash source; dividing, by the server load balancing apparatus, a hash result of the hash function application by a total number of a plurality of servers and obtaining a remaining value obtained by the dividing as a hash value; selecting, by the server load balancing apparatus, a server from among the plurality of servers based on the hash value; and connecting, by the server load balancing apparatus, the client to the selected server.

Another embodiment of the present invention provides a method for processing server load balancing, including: receiving, by a server load balancing apparatus, a uniform resource locator (URL) from a client; selecting, by the server load balancing apparatus, a hash source from the URL and applying a predetermined hash function to the hash source; dividing, by the server load balancing apparatus, a hash result of the hash function application by a first number which is greater than a total number of a plurality of servers and obtaining a remaining value obtained by the dividing as a hash value; selecting, by the server load balancing apparatus, a server from among the plurality of servers based on the hash value; and connecting, by the server load balancing apparatus, the client to the selected server.

The selecting of a server may select a server corresponding to the hash value from a server matching table in which available remaining values are divided into a plurality of groups and a server is matched with each of the groups.

The range of each group for dividing the available remaining values may be changed based on a total number of the plurality of servers.

Yet another embodiment of the present invention provides a method for processing server load balancing, including: receiving, by a server load balancing apparatus, a uniform resource locator (URL) from a client; selecting, by the server load balancing apparatus, a hash source from the URL and applying a predetermined hash function to the hash source; obtaining, by the server load balancing apparatus, a hash result of the hash function application as a hash value; determining, by the server load balancing apparatus, whether there is a previously selected server corresponding to the hash value in a server history table; selecting, by the server load balancing apparatus, the previously selected server from among a plurality of servers when there is a previously selected server corresponding to the hash value; and connecting, by the server load balancing apparatus, the client to the selected server.

The method may further include selecting, by the server load balancing apparatus, a server from among the plurality of servers in consideration of a load of each server when there is no previously selected server corresponding to the hash value.

The selecting of a server may include determining available capacity including workload and transmission traffic by each of the plurality of servers, and selecting a server having a largest available capacity from among the plurality of servers.

The methods for processing server load balancing may further include determining whether the selected server can provide a service, and the connecting of a client may connect the client to the selected server when the selected server can provide a service.

The determining may include determining that the selected server cannot provide a service in a case in which the selected server is in a service unavailable state. The service unavailable state may include at least one among a system failure state in which a physical and/or software failure occurs such that a server cannot provide a service, an overload state in which a server normally operates physically and through software, but cannot provide further service since the entire available capacity is being used for providing services, and a state in which a server normally operates physically and through software, but cannot provide a service since there is no contents for the service.

The method may further include generating a new hash source to apply the hash function when the selected server cannot provide a service, wherein a server may be selected based on a hash value obtained by applying the hash function to a new hash source.

The generating of a new hash source may include using the hash result of the hash function application as a new hash source. In addition, the generating of a new hash source may include using a string including the hash result of the hash function application and the URL as a new hash source.

The connecting of a client may include providing a parameter obtained from the URL from the client to the selected server to request contents corresponding to the parameter, and receiving a response corresponding to the requesting from the selected server and providing the response to the client.

Yet another embodiment of the present invention provides an apparatus for processing server load balancing to a plurality of servers, including: a data obtaining unit for receiving a uniform resource locator (URL) from a client; a function applying unit for selecting a hash source from the URL and applying a predetermined hash function to the hash source; a server selection unit for selecting a server from among a plurality of servers according to a hash value based on a hash result obtained by the hash function application; and a connecting unit for connecting the client to the selected server.

The server selection unit may divide the hash result of the hash function application by a total number of the plurality of servers and use a remaining value obtained by the dividing as a hash value.

Also, the server selection unit may include a server matching table in which available remaining values are divided into a plurality of groups and a server is matched with each of the groups. Here, the server selection unit may divide the hash result of the hash function application by a first number that is greater than a total number of the plurality of servers, use a remaining value obtained by the dividing as a hash value, and select a server corresponding to the hash value from the server matching table.

In addition, the server selection unit may include a server history table including server selection history of information on servers that were selected corresponding to hash values respectively. Here, the server selection unit may use the hash result obtained by the hash function application as a hash value and select a server that was previously selected corresponding to the hash value from the server history table.

The server selection unit may determine available capacity including workload and transmission traffic by each of the plurality of servers, and select a server having a largest available capacity from among the plurality of servers when there is no previously selected server corresponding to the hash value.

The function applying unit may use the hash result of the hash function application as a new hash source, and apply the hash function to the new hash source to obtain a new hash result when the selected server cannot provide a service.

The function applying unit may use a string including the hash result of the hash function application and the entire or a part of the URL as a new hash source, and apply the hash function to the new hash source to obtain a new hash result when the selected server cannot provide a service.

The function applying unit may select at least one among a protocol, a domain or IP, a folder, a file name, and a parameter including the URL when selecting a hash source from the URL.

The server selection unit may use information on an Internet service provider (ISP), a country, and a local region according to an IP of the client when selecting a server.

In the apparatus, the selected server may be a server group including one or more servers.

Advantageous Effects

According to an exemplary embodiment of the present invention, even though the number and volume of contents increase, it is possible to efficiently distribute a load of servers.

In addition, the efficiency of a server and storage is maximized.

DESCRIPTION OF THE DRAWINGS

FIG. 4 shows an example of the results of hash function application.

MODE FOR INVENTION

Figure 1:
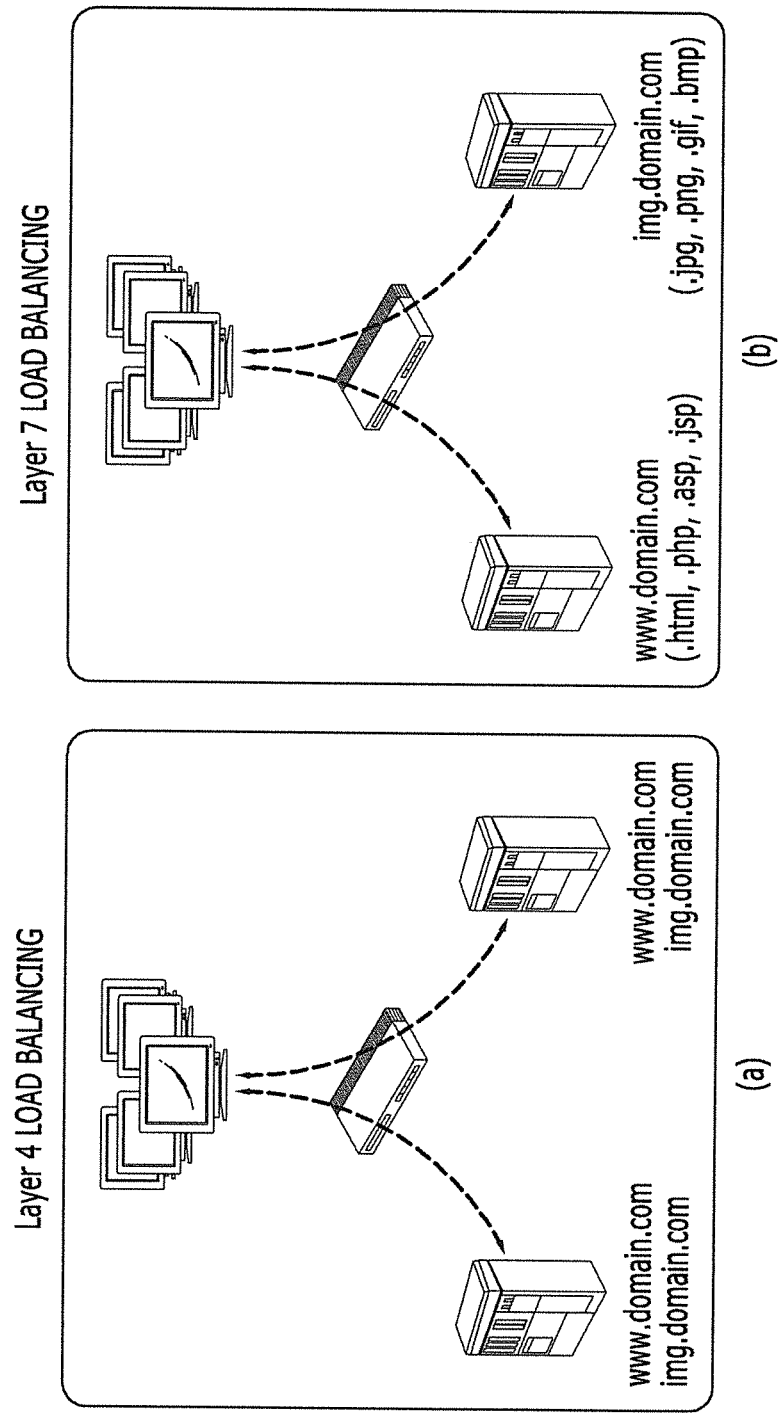
FIG. 1 shows prior server load balancing.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Through the specification, in addition, unless explicitly described to the contrary, the word "comprise" and variations such as "comprises" or "comprising" will be understood to imply the inclusion of stated elements but not the exclusion of any other elements.

Next, a method and apparatus for processing server load balancing according to an exemplary embodiment of the present invention will be described with reference to drawings.

In an exemplary embodiment of the present invention, load balancing is performed by using a hashing method for a hyper text transfer protocol (HTTP) uniform resource locator (URL) input from a client. The hashing method obtains the hash results of applying a hash function to an HTTP URL of a packet input from a client. In an exemplary embodiment of the present invention, server load balancing is performed based on hash values according to the hash results.

The HTTP URL represents a rule of notifying where a resource is on an HTTP network and consists of the following structure.

HTTP URL=protocol+domain name+file path+
parameter(get parameter)

Here, the protocol represents "http://", and the domain name represents a host name. The file path includes a folder and a file name, and the folder and the file name are separated by "/". The parameter (i.e., a get parameter) starts with "?" and each of a plurality of parameters are separated by "&".

The HTTP URL consisting of the above structure may be exemplarily represented as an example of http://vod.domain.com/vod/sample.mp4?id=1234. Here, the "http" represents a protocol, the "vod.domain.com" represents a domain name, the "/vod/sample.mp4" represents a file path, and the "id=1234" represents a parameter.

In an exemplary embodiment of the present invention, a hash function (or a hash algorithm) is applied to the HTTP URL of the above structure to obtain a hash value. The hash function generates a kind of electronic fingerprint with a short length from data. The hash function generates the results by using a method of cutting and substituting data, shifting data's location, and others, wherein the results are referred to as "a hash result". In an exemplary embodiment of the present invention, a hash value for selecting a server is obtained based on the hash result. The hash function deterministically operates. If two hash results are different each other, original data for each of the hash results has to be different. The opposite of this is not valid. The reliability of the hash function is determined based on how rare hash collisions are, that is, the cases in which two hash results for different data are the same occurs. As the hash collisions more often occur, identifying data may become more difficult and the cost of searching data may increase.

If two hash results are different at a base, the hash function has a deterministic feature in which original data related to the hash results is different, but it is not an injective function. This does not mean a guarantee that original data related to the hash results is the same if the two hash results are the same, but to imply that. Even if one bit of the original data is changed, the hash results vary greatly because of the features of the hash function.

Figure 2:
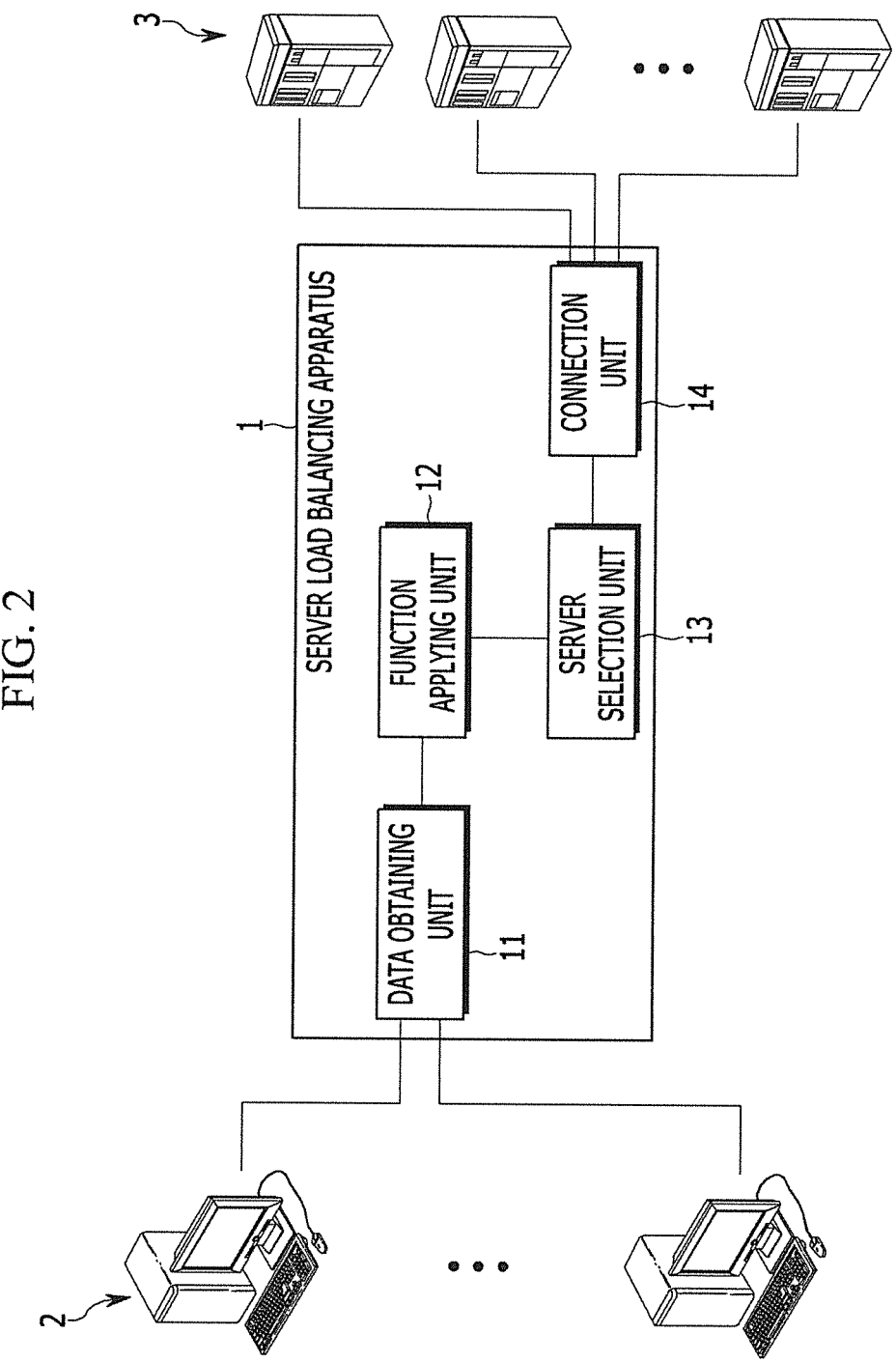
FIG. 2 shows a structure of an apparatus for processing server load balancing according to an exemplary embodiment of the present invention.

FIG. 2 shows a structure of an apparatus for processing server load balancing according to an exemplary embodiment of the present invention.

As shown in FIG. 2, an apparatus for processing server load balancing according to an exemplary embodiment of the present invention, that is, a server load balancing apparatus 1, is connected to a plurality of clients 2 through a network, and is also connected to a plurality of servers 3.

The server load balancing apparatus 1 applies a hash function to data input from the client 2 to obtain the hash result of the hash function application and connects the client 2 to one among the plurality of servers 3 based on a hash value corresponding to the hash result.

For this purpose, the server load balancing apparatus 1 includes a data obtaining unit 11 for obtaining data from the client 2, a function applying unit 12 for applying a hash function to the obtained data, a server selection unit 13 for selecting a server based on a hash value corresponding to the hash results of the hash function application, and a connecting unit 14 for sending the request of the client 2 to the selected server.

The function applying unit 12 selects a part to which a hash function is applied from the obtained data and applies the hash function to the part of obtained data to obtain the results. The results are used as a hash value, or a value obtained by performing a predetermined process to the results is used as a hash value.

Meanwhile, to select a server according to the hash value, a plurality of servers 3 are matched with predetermined hash values.

Figure 3:
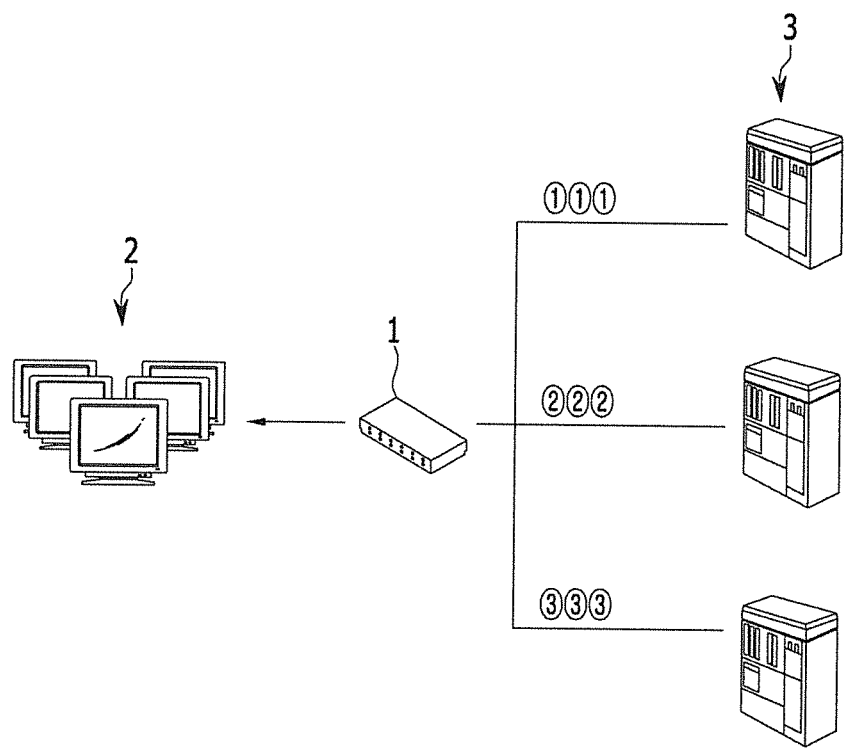
FIG. 3 shows an example of a server matching relationship based on a hash value.

FIG. 3 shows an example of a server matching relationship based on a hash value.

As shown in FIG. 3, for example, if hash values are ①, ②, and ③, a hash value of "①" is matched with a server 31, a hash value of "②" is matched with a server 32, and a hash value of "③" is matched with a server 33. In the above case, one among the plurality of servers 31~33 is selected based on a hash value obtained from the data input from the client 2. If the same of a URL is input, the same hash value is always obtained, thereby the request of the client 2 may be sent to the same server.

Applying a hash function to data input from a client in the server load balancing apparatus 1 will be described with an example.

FIG. 4 shows an example of the results of hash function application.

It is assumed that data extracted from a packet input from the client 2, that is, input data of URL is http://vod.domain.com/vod/sample.mp4?id=1234 related to motion picture contents, as shown in (A) of FIG. 4.

When there are a plurality of servers, for example, N servers (server [0]~server [N−1]) (here, the N is a positive integer), a server selected based on the hash function application may be a server [(int) hash function (HTTP URL) % N].

A hash function is applied to a file path of "vod/sample.mp4" among the input data (URL) of http://vod.domain.com/vod/sample.mp4?id=1234. The part to which the hash function is applied among the input data (URL) is referred to as "a hash source". Here, the file path of the input data (URL) is used as the hash source, but is not restricted thereto. For example, other elements constituted of an HTTP URL such as a domain name and information on an HTTP header such as a user agent may be further used as the hash source as necessary.

If a hash function of "MD5" is applied to the file path of "vod/sample.mp4" among the input data (URL), a string of 32 characters is obtained as in (B) of FIG. 4. Meanwhile, when "CRC32" is used as a hash function, a ten-digit integer may be obtained as in (C) of FIG. 4. If the hash function of "CRC32" is applied, the hash result of "3756904710" is obtained, and then the hash result is divided by the number of servers, that is, "N", a hash value of "3756904710%4=2" is obtained. As in the above, according to the hash value of "2", a server [2] may be selected.

In an exemplary embodiment of the present invention, when a server is selected based on the hash value obtained by applying the hash function to the input data (URL), the request of the client is provided to the selected server. A more detailed description of providing the request of the client to the selected server will be described later when describing connecting the client to the server.

Next, a method for processing server load balancing according to exemplary embodiments of the present invention will be described.

Here, it is assumed that there are N servers (or N server groups) and hash values of S[0]-S[N−1] are respectively allocated to the servers.

First, a method for processing server load balancing according to the first exemplary embodiment of the present invention will be described.

Figure 5:
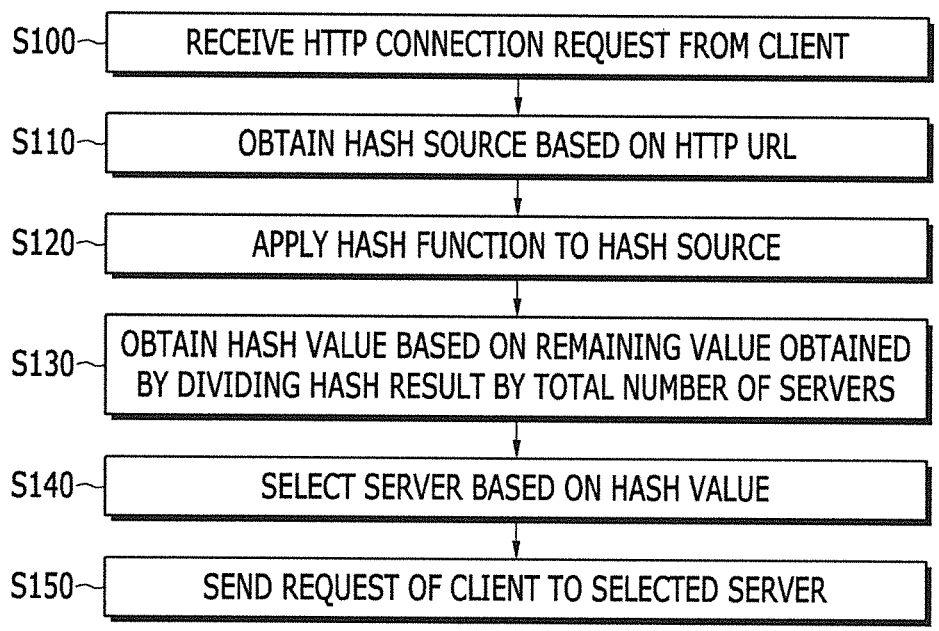
FIG. 5 shows a method for processing server load balancing according to a first exemplary embodiment of the present invention.

FIG. 5 shows a method for processing server load balancing according to a first exemplary embodiment of the present invention.

The server load balancing apparatus 1 receives input data, that is, an HTTP connection request, from the client 2 (S100).

The server load balancing apparatus 1 obtains a URL from the HTTP connection request and obtains a hash source to which a hash function is applied from the URL (S110). Here, a file path of the URL is used as the hash source, but is not restricted thereto. The server load balancing apparatus 1 obtains the hash result by applying a predetermined hash function to the hash source (S120) and obtains a hash value from the hash result to select a server.

In the first exemplary embodiment of the present invention, a remaining value obtained by dividing the hash result by "N", the total number of servers, is used as the hash value (S130). For example, when there are servers of S0, S1, S2, and S3 and the hash result of "3756904710" is obtained by applying the hash function (e.g., CRC32) to the hash source of "/vod/sample.mp4" obtained from the URL of http://vod.domain.com/vod/sample.mp4?id=1234, the remaining value of "2" obtained by dividing the hash result of "3756904710" by "4" is used as the hash value.

The server load balancing apparatus 1 selects one from among the plurality of servers based on the obtained hash value (S140). The server load balancing apparatus 1 sends the request of the client to the selected server (S150). For example, a server S2 corresponding to the hash value of "2" is selected and the client is connected to the server S2.

In the first exemplary embodiment of the present invention, it is possible to simply and efficiently distribute a load of servers.

Next, a method for processing server load balancing according to the second exemplary embodiment of the present invention will be described.

Figure 6:
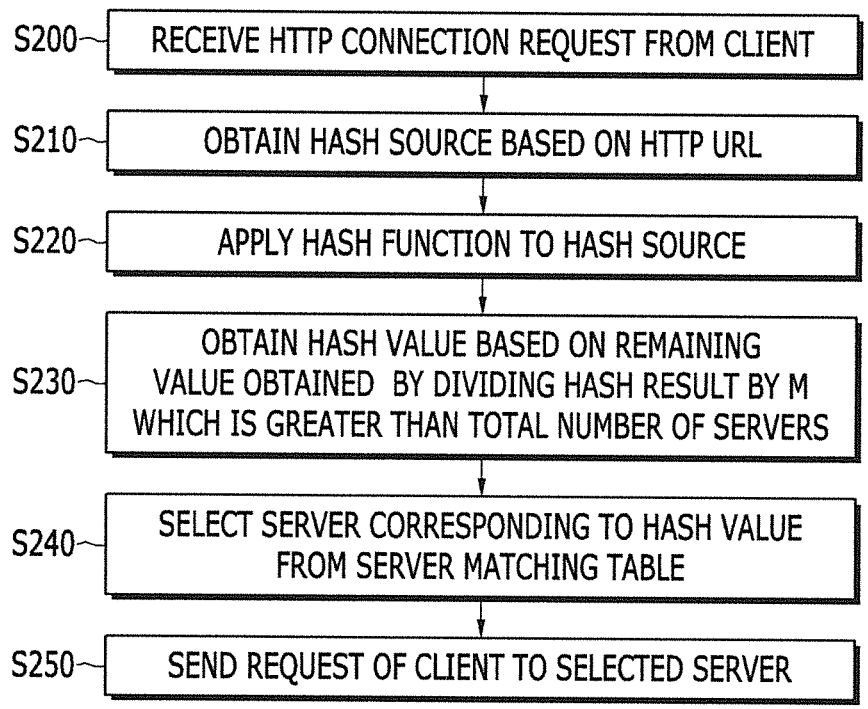
FIG. 6 shows a method for processing server load balancing according to a second exemplary embodiment of the present invention.

FIG. 6 shows a method for processing server load balancing according to the second exemplary embodiment of the present invention.

A method for easily performing server load balancing even if the number of servers (or server groups) is changed is provided in the second exemplary embodiment of the present invention.

As in the first exemplary embodiment, the server load balancing apparatus 1 receives an HTTP connection request from the client 2, obtains a hash source from the URL of the HTTP connection request, and obtains a hash value by applying a hash function to the hash source, as in FIG. 6 (S200-S220).

The server load balancing apparatus 1 obtains the hash value by applying a predetermined hash function to the hash source. In the second exemplary embodiment of the present invention, remaining values of 0~M−1 obtained by dividing the hash result of the predetermined hash function application by the value of "M" (here, M is a positive integer) which is greater than the total number "N" of servers are used as hash values (S230). Particularly, according to the second exemplary embodiment of the present invention, the remaining values obtained by dividing the hash result by M which is greater than N are used, and thereby the number of remaining values is larger than the total number of servers. Accordingly, the server load balancing apparatus 1 matches obtainable remaining values to servers with a server matching table in advance and then selects a server corresponding to the hash value obtained through step S230 by using the server matching table.

That is, the obtainable remaining values are divided into a plurality of groups, a server matching table for matching a server to each of the plurality of groups is generated in advance, and then a server corresponding to the hash value from the server matching table is selected. For example, when there are servers of S0, S1, S2, and S3, and M=100, a server matching table such as the following Table 1 may be used.

TABLE 1

| Remaining value (hash result % M) | Server (or server group) |
|---|---|
| 0-24 | S0 |
| 25-49 | S1 |
| 50-74 | S2 |
| 75-99 | S3 |

As in the Table 1, the obtainable remaining values of 0~99 are divided into four groups (the first group of 0-24, the second group of 25-49, the third group of 50-74, and the fourth group of 75-99) and a server matching table for matching a server to each of the four groups may be used. The server matching table may be stored and managed in the server selection unit 13 of the server load balancing apparatus 1.

For example, as in the first exemplary embodiment, when the hash function is applied to the hash source of "Nod/sample.mp4" and then the hash result of "3756904710" is obtained, the remaining value of "10" obtained by dividing the hash result of "3756904710" by the M of "100" is used as a hash value.

The server load balancing apparatus 1 selects a server corresponding to the hash value from among the plurality of servers with the predetermined server matching table (S240), and provides the request of the client 2 to the selected server (S240). For example, from the server matching table like the Table 1, a server S0 corresponding to the hash value of "10" is selected and the client is connected to the server S0.

According to the second exemplary embodiment of the present invention, it is possible to adaptively and efficiently perform server load balancing even if the number of servers is changed. Specifically, even if the number N of servers (or server groups) is changed to the number M of servers (or server groups), the load of the servers is efficiently distributed by controlling the server matching table.

For example, when the number of servers is N, contents are cached in local storages of N servers (e.g., disks, memory), and load balancing according to the first exemplary embodiment is performed, and if the number N of servers is changed to "M", the problem of reaching the cached contents in the servers may occur. In this case, processing of the request of the client may be delayed.

However, according to the second exemplary embodiment of the present invention, load balancing is easily performed by adjusting the range of remaining values in the server matching table even if the total number of servers is changed.

For example, it is assumed that the number of servers is changed to "5" when using the server matching table such as Table 1. In this case, the range of remaining values in the server matching table may be adjusted as in the following Table 2.

TABLE 2

| Remaining value (hash result % M) | Server (or server group) |
|---|---|
| 0-19 | S0 |
| 25-44 | S1 |
| 50-69 | S2 |

When the number of servers is reduced to "3", the range of remaining values in the server matching table may be adjusted as in the following Table 3.

TABLE 3

| Remaining value (hash result % M) | Server (or server group) |
|---|---|
| 0-19, 75-82 | S0 |
| 25-44, 83-90 | S1 |
| 50-69, 91-99 | S2 |

As in the above, according to the second exemplary embodiment of the present invention, the ranges of remaining values matched to each server in the server matching table may be adjusted according to the number of servers, such that it is possible to perform adaptive load balancing even if the number of servers is changed.

Next, a method for processing server load balancing according to the third exemplary embodiment of the present invention will be described.

Figure 7:
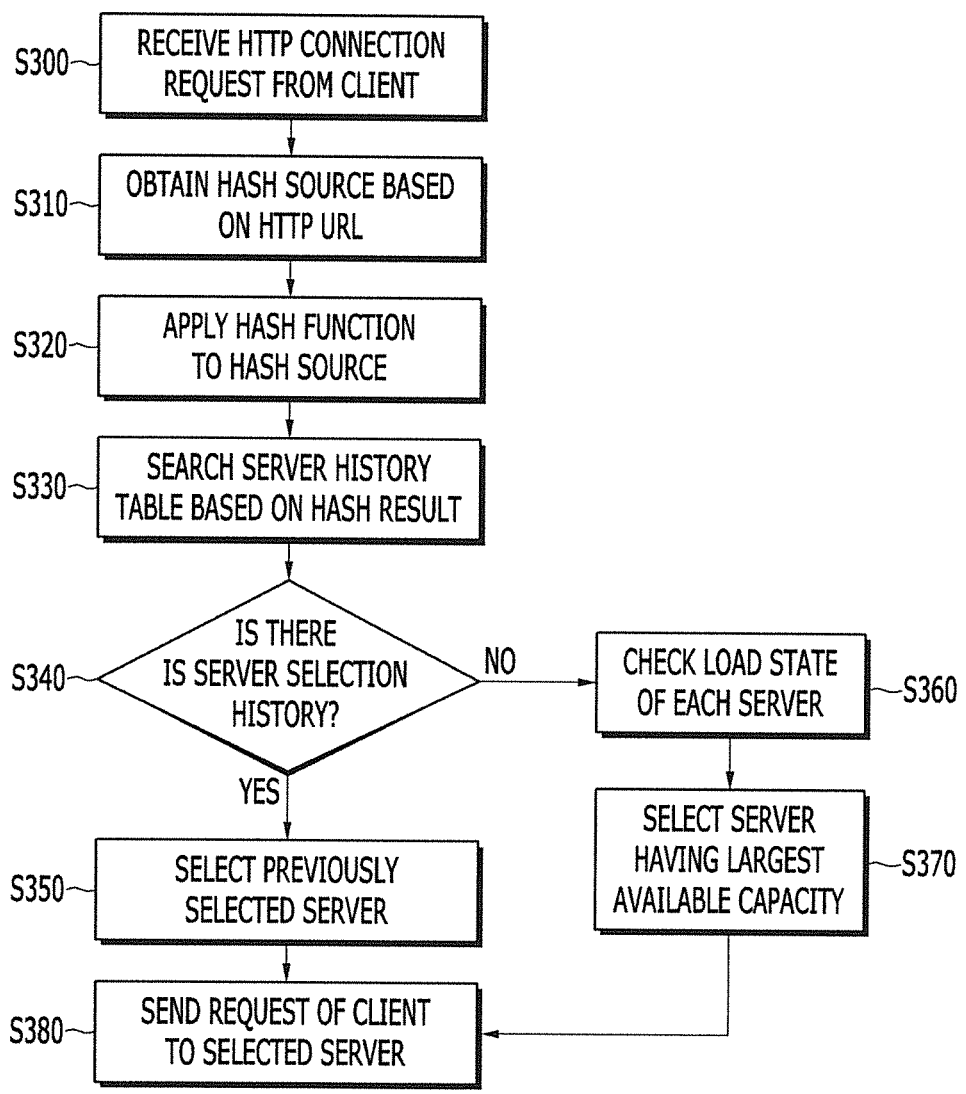
FIG. 7 shows a method for processing server load balancing according to a third exemplary embodiment of the present invention.

FIG. 7 shows a method for processing server load balancing according to the third exemplary embodiment of the present invention.

As in the first exemplary embodiment, the server load balancing apparatus 1 receives an HTTP connection request from the client 2, obtains a hash source from the URL of the HTTP connection request, and obtains a hash value by applying a hash function to the hash source, as in FIG. 7 (S300-S320).

The server load balancing apparatus 1 obtains the hash value by applying a predetermined hash function to the hash source, selects a prior selected server if there is the prior selected server corresponding to the obtained hash value, and selects a server in consideration of the load of servers if there is no prior selected server corresponding to the obtained hash value. For this purpose, in the third exemplary embodiment of the present invention, a history table for storing server selection history is stored and managed. The server selection history includes information on servers that were previously selected. For example, the server selection unit 13 of the server load balancing apparatus 1 may store and manage the server history table, and the server history table may be realized in a form of a database.

The server history table according to the third exemplary embodiment of the present invention may be shown as in the following Table 4.

TABLE 4

| Hash result | Server (or server group) |
|---|---|
| 1546554652 | S0 |
| 5456446846 | S1 |
| 3756904710 | S2 |

As in Table 4, the server history table according to the third exemplary embodiment of the present invention stores information of the servers that were selected based on the hash result obtained by applying the hash function to the hash resource. Here, the hash result is used as the hash value for selecting a server.

For example, when there are servers of S0, S1, S2, and S3 and the hash result of "3756904710" is obtained by applying the hash function (e.g., CRC32) to the hash source of "/vod/sample.mp4" from the URL of http://vod.domain.com/vod/sample.mp4?id=1234, it is determined which there is the previous selected server in the server history table based on the hash result of "3756904710". From the server history table as Table 4, it is determined that the server S4 corresponding to the hash result of "3756904710" was selected. Finally, the server S4 is selected as a server to receive the request of the client.

Based on the above, the server load balancing apparatus 1 uses the hash result obtained by applying the predetermined hash function to the hash source as a hash value and determines that there is a server which was selected based on the hash value in the server history table (S300 and S340).

When there is a server which was selected based on the hash value in the server history table, the server load balancing apparatus 1 selects the server (S330). However, when there is no server which was selected based on the hash value in the server history table, the server load balancing apparatus 1 selects a server in consideration of a load state of each server (S360).

Here, the load state of the server represents workload and available capacity in consideration of transmission traffic in a server. To manage the load state of server, the server load balancing apparatus 1 may include a server available capacity database. The server available capacity database may be shown in the following Table 5.

TABLE 5

| Hash result | Server (or server group) |
|---|---|
| 1546554652 | S0 |
| 5456446846 | S1 |
| 3756904710 | S2 |

The server load balancing apparatus 1 checks a load state of each server from the server available capacity database and selects a server having the largest available capacity. For example, from the servers S0, S1, S2, and S3, the server S1 that now has the largest available capacity is selected (S370). The server load balancing apparatus 1 stores history on the selected server in the server history table. That is, the information on the server selected based on the load state of servers is stored in the server history table.

After this, the server load balancing apparatus 1 sends the request of the client to the selected server (S380).

According to the third exemplary embodiment of the present invention, by using the previous server selection history corresponding to the requests of clients, it is possible to use most of the contents cached in a storage of each server and to improve the response to requests of clients.

In addition, even if there is no previous server selection history, the requests of clients are processed by selecting a server based on the available capacity of servers, such that it is possible to minimize a specific server (or a server group) from only being driven by workload.

Next, a method for processing server load balancing according to the fourth exemplary embodiment of the present invention will be described.

Figure 8:
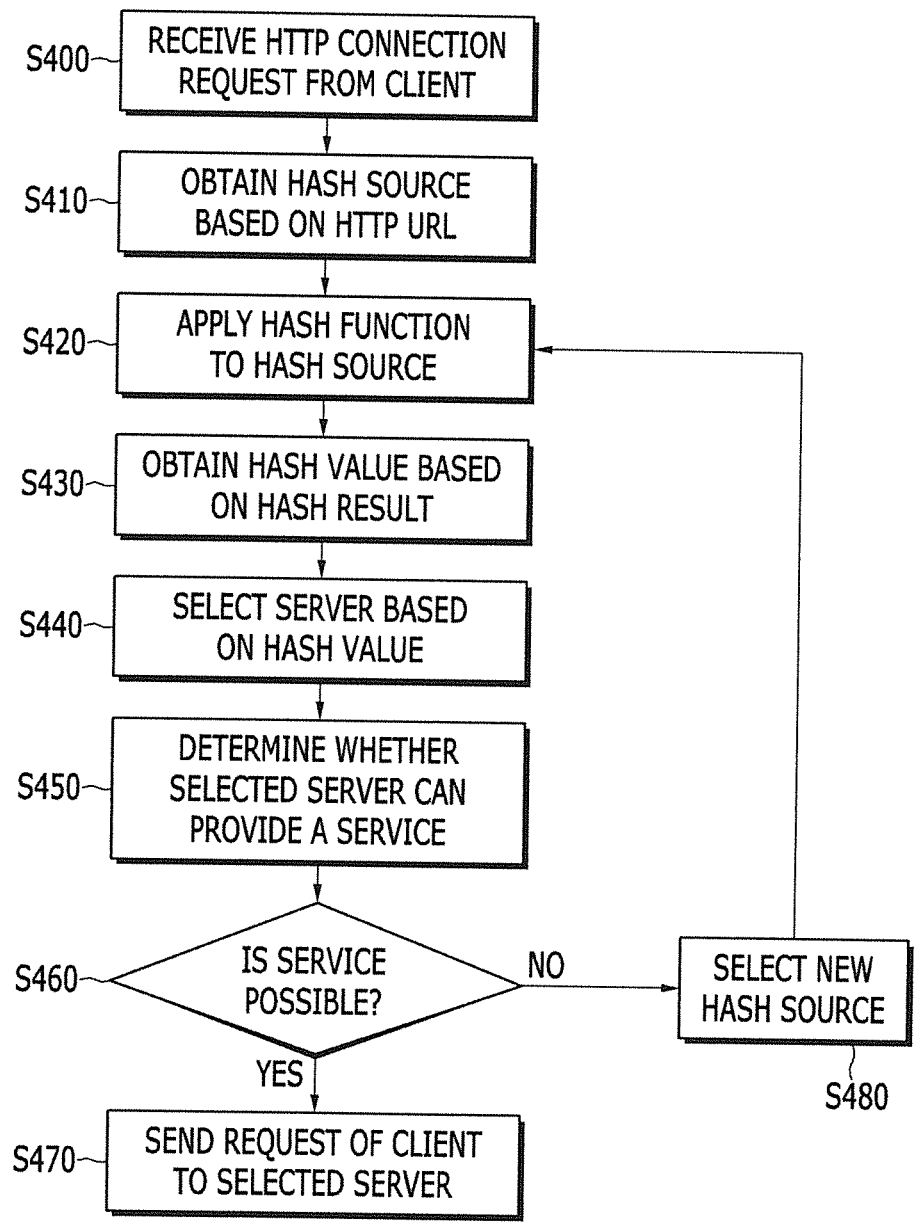
FIG. 8 shows a method for processing server load balancing according to a forth exemplary embodiment of the present invention.

FIG. 8 shows a method for processing server load balancing according to the fourth exemplary embodiment of the present invention.

A method for processing server load balancing according to the fourth exemplary embodiment of the present invention selects a server corresponding to the request of client and connects the client to the selected server based on whether the selected server can provide a service.

The server selected based on the method according to the above exemplary embodiments may be out of service. For example, first, the server may be in a system failure state in which a physical and/or software failure occurs such that the server cannot provide a service. Second, the server may be in an overload state in which the server normally operates physically and through software, but cannot provide further service since the entire available capacity is being used for providing services. Lastly, the server may be in a state in which the server normally operates physically and through software, but cannot provide a service since there is no contents for the service.

Accordingly, the server load balancing apparatus 1 according to the fourth exemplary embodiment of the present invention determines whether the selected server is in a service unavailable state, and selects another server when the selected server cannot provide a service.

As the first exemplary embodiment, the server load balancing apparatus 1 receives an HTTP connection request from the client 2, obtains a hash source from the URL of the HTTP connection request, and obtains a hash value by applying a hash function to the hash source, as in FIG. 8 (S400-S420).

The server load balancing apparatus 1 obtains a hash value by applying a predetermined hash function to the hash source (S430) and selects a server based on the obtained hash value (S440). Here, in order to select a server, one among the methods for selecting a server described in the first exemplary embodiment to the third exemplary embodiment may be used.

The server load balancing apparatus 1 determines whether the selected server can provide a service (S450). When the selected server is not in a service unavailable state, the server load balancing apparatus 1 determines that the selected server can provide a service and then sends the request of the client to the selected server (S460 and S470).

Meanwhile, when the selected server is in one of the above service unavailable states, the server load balancing apparatus 1 determines that the selected server cannot provide a service and again selects a server. For this purpose, the server load balancing apparatus 1 regenerates a hash source to apply the hash function (S480).

Specifically, the previous hash result obtained in the step S420 or a string including the previous hash result is used as a new hash source. The hash function is performed recursively. For example, when the previous hash result is "Hash (URL)", a hash result of "Hash(URL)" is obtained by applying a hash function to the previous hash as a hash source.

Then, a server is selected based on a hash value according to the hash result. At this time, if the selected server is in a service unavailable state, a procedure for generating a new hash source and selecting a new server based on the new hash source may be repeatedly performed. In this case, for example, a procedure for generating a hash source based on the following Equation 1 may be repeatedly performed. Here, n represents the repetition number of performing the procedure until a server able to provide a service is selected.

$$\text{Hash}(URL, n) = \begin{cases} \text{Hash}(URL), & n = 1 \\ \text{Hash}(URL, n-1), & n \geq 2 \end{cases} \quad \text{(Equation 1)}$$

Base on Equation 1, the hash results in the following form may be generated and a server may be selected based on the hash results.

The first hash result: $\text{Hash}(URL)$

The second hash result: $\text{Hash}(\text{Hash}(URL))$

The third hash result: $\text{Hash}(\text{Hash}(\text{Hash}(URL)))$

...

The $n$-th hash result: $\text{Hash}(\text{Hash}(URL, n-1))$

Meanwhile, when generating a new hash source, a new hash result may be obtained by using a string including the previous hash result and the URL obtained from the client as a new hash source. For example, a hash source including the previous hash result of "Hash(URL)" and the "URL" from the client is applied to the hash function and then the hash result of "Hash(Hash(URL)+URL)" may be obtained. Generating the hash source as above is used in a case in which the range of the hash result is relatively narrow in comparison to the other hash functions or in a case in which it is desired to obtain a different value from the value obtained in the first step for applying a hash function, but is not limited thereto.

The procedure for generating a hash source, for example, may also be repeatedly performed based on the following Equation 2. Here, n represents the repetition number of performing the procedure until a server able to provide a service is selected.

$$\text{Hash}(URL) = \begin{cases} \text{Hash}(URL), & n=1 \\ \text{Hash}(\text{Hash}(URL, n-1) + URL), & n \geq 2 \end{cases} \quad \text{(Equation 2)}$$

Based on Equation 2, the hash results and hash sources in the following form may be repeatedly generated.

The first hash result: $\text{Hash}(URL)$

The second hash result: $\text{Hash}(\text{Hash}(URL) + URL)$

The third hash result: $\text{Hash}(\text{Hash}(\text{Hash}(URL) + URL) + URL)$

...

The $n$-th hash result: $\text{Hash}(\text{Hash}(URL, n-1) + URL)$

In addition, if a client IP in addition to the hash result to the URL is further considered when selecting a server, load balancing by an Internet service provider (ISP), country, and local region may be possible.

Next, a process for connecting a client to a selected server by sending the request of the client to the selected server in the methods for processing server load balancing according to the above exemplary embodiments of the present invention will be described.

Figure 9:
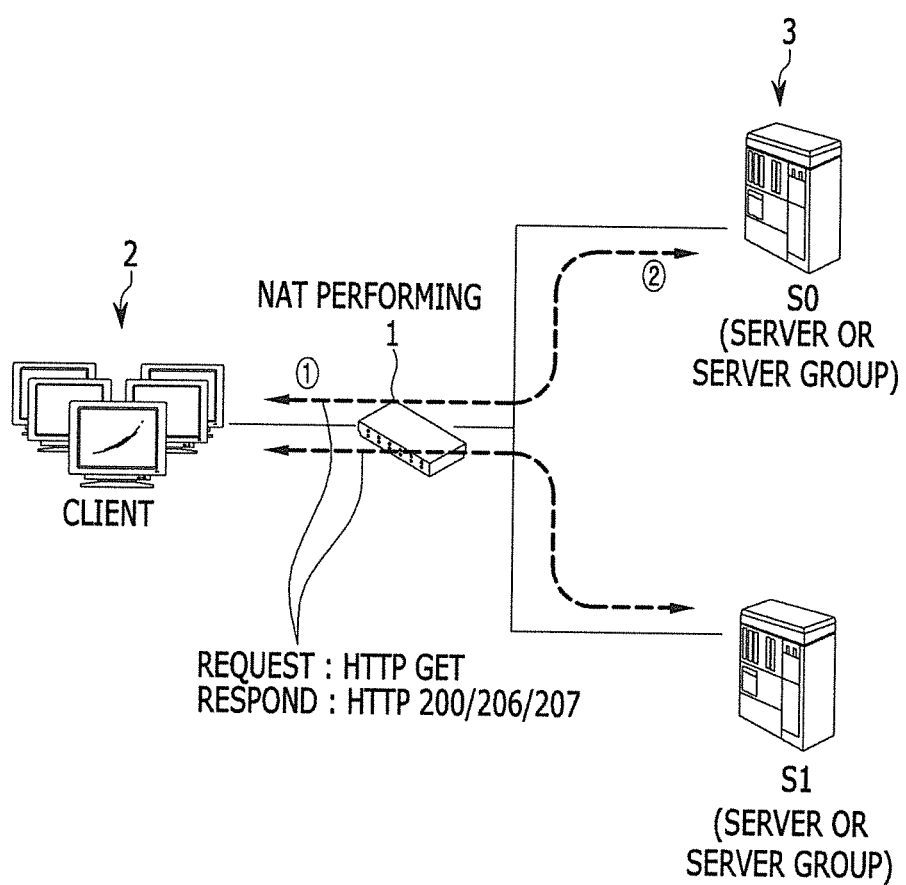
FIG. 9 shows an example of a server connection process according to an exemplary embodiment of the present invention.

FIG. 9 shows an example of a server connection process according to an exemplary embodiment of the present invention.

The server load balancing apparatus 1 according to an exemplary embodiment of the present invention may receive a packet for requesting a connection from the client 2 and connect the client to a selected server by changing the destination address of the packet.

As shown in FIG. 9, the server load balancing apparatus 1 may be embodied in the form of being based on L7 and including an L4 load balancing function, and thereby the server load balancing apparatus 1 is connected with the client with L7. The server load balancing apparatus 1 requests contents, which correspond to the GET parameter obtained from the connection request HTTP URL from the client 2, from a server (e.g., S0) selected from among a plurality of servers, receives the response to the request from the selected server, and provides it to the client 2.

According to the process for connecting, the client 2 has no need to know the structure of L7 load balancing, and the response is provided to the client 2 through the selected server by the server load balancing apparatus 1 with the structure of L7 load balancing. Particularly, the process for connecting is efficiently used when providing low volume contents having low traffic such as an HTML, a text, an image, and others.

Figure 10:
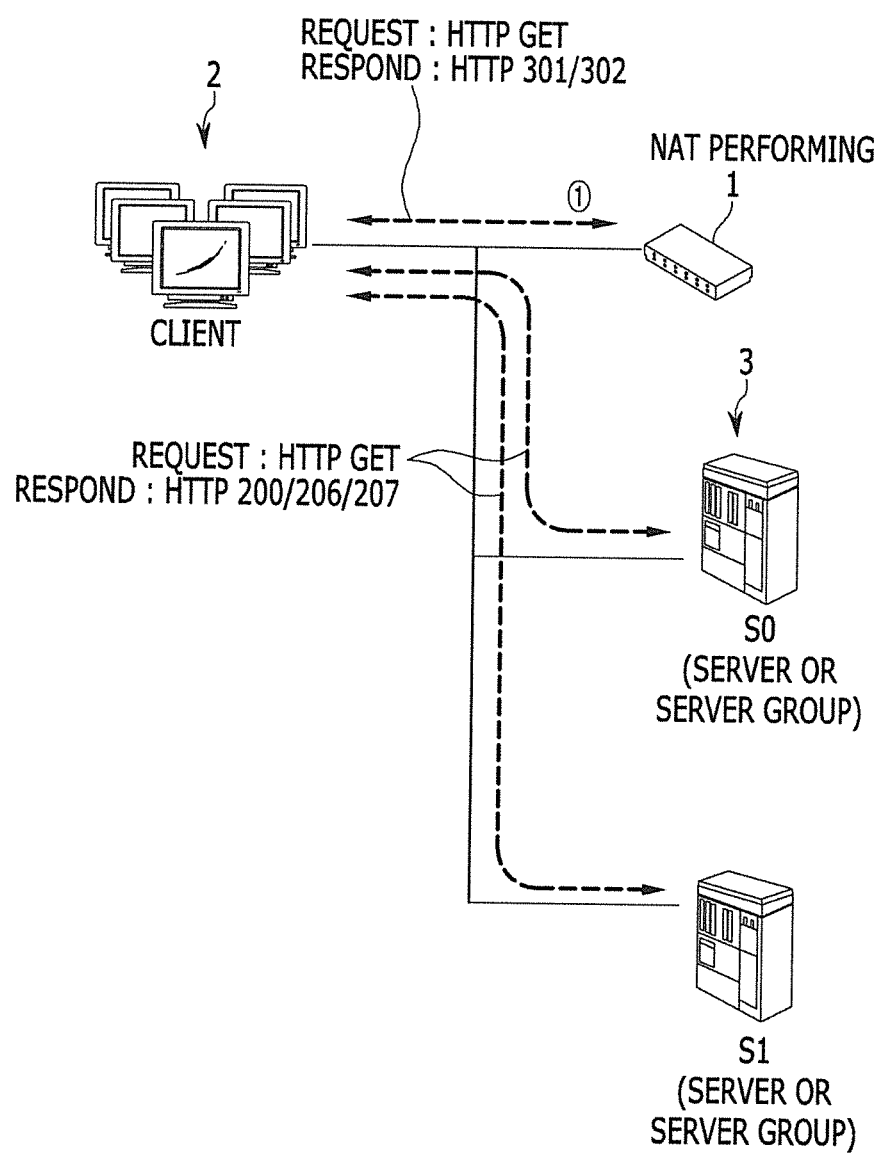
FIG. 10 shows another example of a server connection process according to an exemplary embodiment of the present invention.

FIG. 10 shows another example of a server connection process according to an exemplary embodiment of the present invention.

The server load balancing apparatus 1 according to an exemplary embodiment of the present invention may receive a packet for requesting a connection from the client 2, and provide a redirection URL including a domain or IP information of a selected server to the client 2 so that the client 2 is connected to the selected server.

The process for connecting as above may be performed when the client 2 does not support a program for performing a function for requesting a page from a server according to a transmission control protocol (TCP), but supports HTTP 301/302 redirection.

When the client 2 supports the HTTP 301/302 redirection, the server load balancing apparatus 2, as shown in FIG. 10, provides a redirection URL including information on a server which is selected based on the hash source obtained from the HTTP URL from the client 2 to the client 2 in order to connect the client 2 to the selected server. The client 2 accesses the selected server according to the redirection URL provided from the server load balancing apparatus 1.

The process for connecting is efficiently used when transmitting/receiving atypical data having large traffic such as high quality images.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for processing server load balancing by a server load balancing apparatus, comprising:
   receiving, by the server load balancing apparatus, a uniform resource locator (URL) from a client;
   selecting, by the server load balancing apparatus, a hash source from the URL and applying a predetermined hash function to the hash source;
   dividing, by the server load balancing apparatus, a hash result of the hash function application by a total number of a plurality of servers and obtaining a remaining value obtained by the dividing as a hash value;
   selecting, by the server load balancing apparatus, a server from among the plurality of servers based on the hash value;
   connecting, by the server load balancing apparatus, the client to the selected server;
   generating a new hash source to apply the hash function when the selected server cannot provide a service; and
   selecting, by the server load balancing apparatus, a hash value obtained by applying the hash function to the new hash source and connecting the client to the selected server,
   wherein the hash result of the hash function application is used as the new hash source or a string including the hash result of the hash function application and the URL is used as the new hash source.

2. The method of claim 1, further comprising
   determining whether the selected server can provide a service, and
   the connecting of a client connects the client to the selected server when the selected server can provide a service.

3. The method of claim 1, wherein the connecting of a client includes:
providing a parameter obtained from the URL from the client to the selected server to request contents corresponding to the parameter; and
receiving a response corresponding to the requesting from the selected server and providing the response to the client.

4. The method of claim 1, wherein the connecting of a client includes providing a redirection URL including a domain or IP information of the selected server to the client.

5. A method for processing server load balancing by a server load balancing apparatus, comprising:
receiving, by the server load balancing apparatus, a uniform resource locator (URL) from a client;
selecting, by the server load balancing apparatus, a hash source from the URL and applying a predetermined hash function to the hash source;
dividing, by the server load balancing apparatus, a hash result of the hash function application by a first number which is greater than a total number of a plurality of servers and obtaining a remaining value obtained by the dividing as a hash value;
selecting, by the server load balancing apparatus, a server from among the plurality of servers based on the hash value;
connecting, by the server load balancing apparatus, the client to the selected server;
generating a new hash source to apply the hash function when the selected server cannot provide a service; and
selecting, by the server load balancing apparatus, a hash value obtained by applying the hash function to the new hash source and connecting the client to the selected server,
wherein the hash result of the hash function application is used as the new hash source or a string including the hash result of the hash function application and the URL is used as the new hash source.

6. The method of claim 5, wherein the selecting of a server selects a server corresponding to the hash value from a server matching table in which available remaining values are divided into a plurality of groups and a server is matched with each of the groups.

7. The method of claim 6, wherein a range of each group for dividing the available remaining values is changed based on a total number of the plurality of servers.

8. A method for processing server load balancing by a server load balancing apparatus, comprising:
receiving, by the server load balancing apparatus, a uniform resource locator (URL) from a client;
selecting, by the server load balancing apparatus, a hash source from the URL and applying a predetermined hash function to the hash source;
obtaining, by the server load balancing apparatus, a hash result of the hash function application as a hash value;
determining, by the server load balancing apparatus, whether there is a previously selected server corresponding to the hash value in a server history table;
selecting, by the server load balancing apparatus, the previously selected server from among a plurality of servers when there is a previously selected server corresponding to the hash value;
connecting, by the server load balancing apparatus, the client to the selected server;
generating a new hash source to apply the hash function when the selected server cannot provide a service; and
selecting, by the server load balancing apparatus, a hash value obtained by applying the hash function to the new hash source and connecting the client to the selected server,
wherein the hash result of the hash function application is used as the new hash source or string including the hash result of the hash function application and the URL is used as the new hash source.

9. The method of claim 8, further comprising
selecting, by the server load balancing apparatus, a server from among the plurality of servers in consideration of a load of each server when there is no previously selected server corresponding to the hash value,
wherein the server history table includes server selection history of information on servers that were respectively selected corresponding to hash values.

10. The method of claim 9, wherein the selecting of a server includes:
determining available capacity including workload and transmission traffic by each of the plurality of servers; and
selecting a server having a largest available capacity from among the plurality of servers.

11. The method of claim 8, wherein the determining includes determining that the selected server cannot provide a service in a case in which the selected server is in a service unavailable state,
wherein the service unavailable state includes at least one among a system failure state in which a physical and/or software failure occurs such that a server cannot provide a service,
an overload state in which a server normally operates physically and through software, but cannot provide further service since the entire available capacity is being used for providing services, and
a state in which a server normally operates physically and through software, but cannot provide a service since there is no contents for the service.

12. A method for processing server load balancing by a server load balancing apparatus, comprising:
receiving, by the server load balancing apparatus, a uniform resource locator (URL) from a client;
selecting, by the server load balancing apparatus, a hash source from the URL and applying a predetermined hash function to the hash source;
dividing, by the server load balancing apparatus, a hash result of the hash function application by a total number of a plurality of servers and obtaining a remaining value obtained by the dividing as a hash value;
selecting, by the server load balancing apparatus, a server from among the plurality of servers based on the hash value;
connecting, by the server load balancing apparatus, the client to the selected server;
determining whether the selected server can provide a service;
generating a new hash source to apply the hash function when the selected server cannot provide a service; and
selecting, by the server load balancing apparatus, a hash value obtained by applying the hash function to the new hash source and connecting the client to the selected server,
wherein the generating of a new hash source includes using the hash result of the hash function application as a new hash source.

13. A method for processing server load balancing by a server load balancing apparatus, comprising:

receiving, by the server load balancing apparatus, a uniform resource locator (URL) from a client;
selecting, by the server load balancing apparatus, a hash source from the URL and applying a predetermined hash function to the hash source;
dividing, by the server load balancing apparatus, a hash result of the hash function application by a total number of a plurality of servers and obtaining a remaining value obtained by the dividing as a hash value;
selecting, by the server load balancing apparatus, a server from among the plurality of servers based on the hash value;
connecting, by the server load balancing apparatus, the client to the selected server;
determining whether the selected server can provide a service;
generating a new hash source to apply the hash function when the selected server cannot provide a service; and
selecting, by the server load balancing apparatus, a hash value obtained by applying the hash function to the new hash source and connecting the client to the selected server,
wherein the generating of a new hash source includes using a string including the hash result of the hash function application and the URL as a new hash source.

14. A server load balancing apparatus for performing load balancing to a plurality of servers, comprising:
a processor and a coupled memory that executes:
a data obtaining unit configured to receive a uniform resource locator (URL) transmitted from a client;
a function applying unit configured to select a hash source from the URL and apply applying a predetermined hash function to the hash source;
a server selection unit configured to select a server from among a plurality of servers according to a hash value based on a hash result obtained by the hash function application; and
a connecting unit configured to connect the client to the selected server,
wherein, the function applying unit uses the hash result of the hash function application as a new hash source or or uses a string including the hash result of the hash function application and the URL as a new hash source when the selected server cannot provide a service, and applies the hash function to the new hash source to obtain a new hash result, and
wherein the server selection unit divides the hash result of the hash function application by a total number of the plurality of servers and uses a remaining value obtained by the dividing as a hash value.

15. The server load balancing apparatus of claim 14, wherein the server selection unit includes a server matching table in which available remaining values are divided into a plurality of groups and a server is matched with each of the groups,
wherein the server selection unit divides the hash result of the hash function application by a first number that is greater than a total number of the plurality of servers, uses a remaining value obtained by the dividing as a hash value, and selects a server corresponding to the hash value from the server matching table.

16. The server load balancing apparatus of claim 14, wherein the server selection unit includes a server history table server including selection history of information on servers that were respectively selected corresponding to hash values,
wherein the server selection unit uses the hash result obtained by the hash function application as a hash value and selects a server that was previously selected corresponding to the hash value from the server history table.

17. The server load balancing apparatus of claim 16, wherein the server selection unit determines available capacity including workload and transmission traffic by each of the plurality of servers, and selects a server having a largest available capacity from among the plurality of servers when there is no previously selected server corresponding to the hash value.

18. The server load balancing apparatus of claim 14, wherein the function applying unit selects at least one among a protocol, a domain or IP, a folder, a file name, and a parameter including the URL when selecting a hash source from the URL.

19. A server load balancing apparatus for performing load balancing to a plurality of servers, comprising:
a processor and a coupled memory that executes:
a data obtaining unit configured to receive a uniform resource locator (URL) transmitted from a client;
a function applying unit configured to select a hash source from the URL and apply a predetermined hash function to the hash source;
a server selection unit configured to select a server from among a plurality of servers according to a hash value based on a hash result obtained by the hash function application;
a connecting unit configured to connect the client to the selected server,
wherein the function applying unit uses a string as a new hash source, and applies the hash function to the new hash source to obtain a new hash result when the selected server cannot provide a service,
wherein the string includes the hash result of the hash function application and the entire or part of the URL, and
wherein the server selection unit divides the hash result of the hash function application by a total number of the plurality of servers and uses a remaining value obtained by the dividing as a hash value.

* * * * *